UNITED STATES PATENT OFFICE 2,474,820

QUINOLINE COMPOUNDS AND PROCESS OF MAKING SAME

Joseph H. Burckhalter, Detroit, Eldon M. Jones and Albert L. Rawlins, Grosse Pointe Woods, Frank H. Tendick, Grosse Pointe Park, and Walter F. Holcomb, Detroit, Mich., assignors to Parke, Davis & Company, Detroit, Mich., a corporation of Michigan No Drawing. Application February 8, 1945, Serial No. 576,900

14 Claims. (Cl. 260—286)

This invention relates to a class of new chemical compounds having the general formula for the free base

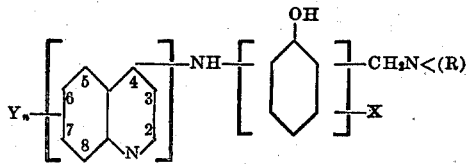

where $Y_n$ represents $n$ substituents Y, $n$ being 1, 2 or 3 and Y a substituent of the class consisting of hydrogen, —NO$_2$, —CN, —COOH and alkali metal salts and lower alkyl esters thereof, halogen, amino, groups hydrolyzable to amino, saturated heterocyclic secondary amines such as, piperidine, pyrrolidine, morpholine and thiomorpholine, lower mono and di-alkyl amino, lower alkyl, lower hydroxy alkyl, lower alkoxy, aryl and lower alkyl substituted aryl. The group —CH$_2$N<(R) in the above formula is either in the ortho or para position to the hydroxy group in said formula. N in said group, —CH$_2$N<(R), when taken with R forms a saturated or unsaturated heterocyclic ring system which may or may not be interrupted by

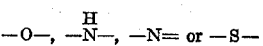

and in addition may or may not be substituted on a carbon atom of said heterocyclic ring by at least one substituent of the class =O, —OH, —COOH, chlorine, bromine, amino, lower monoalkylamino and groups hydrolyzable to said amino groups (e. g. —NHAcyl), lower dialkylamino, lower alkyl, lower hydroxyalkyl and lower alkoxy. In the above formula, X represents hydrogen, chlorine, bromine, hydroxy, lower alkoxy, lower alkyl (saturated or unsaturated), aryl or it may be the same as the group

These new compounds are useful therapeutic agents and, in general, they are characterized by their toxicity to plasmodia. These compounds may be used either in the form of their bases or their salts with organic or inorganic acids such as hydrochloric acid, sulfuric acid, phosphoric acid, sulfamic acid, acetic acid, lactic acid, tartaric acid, gluconic acid, citric acid and alkyl sulfonic acids or as the insoluble salt of methylene disalicylic acid.

This application is a continuation-in-part of our copending application, Serial No. 539,990, filed June 12, 1944, now Patent No. 2,428,355, issued October 7, 1947.

The new compounds of this invention may be prepared by the condensation of certain intermediates which, for convenience, are herein designated as compounds A and B. Compound A is a substituted amino phenol and has the general formula,

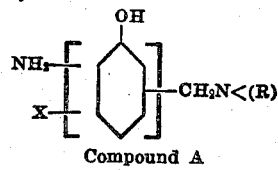

Compound A where —CH$_2$N<(R) and X have the same significance as described above.

Compound B is a halogen substituted quinoline and has the general formula

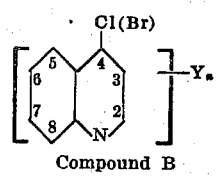

Compound B where Y and $n$ have the same significance as given above.

It should also be understood from the above formula that instead of having a chlorine atom at the position 4, intermediate B may have a bromine atom in this position.

The condensation may be carried out by causing approximately equimolar quantities of compounds A and B to react in the presence or absence of a suitable aqueous or non-aqueous organic solvent. The reaction may be carried out in alkaline, neutral or acid solution but preferably it is carried out in the presence of a dilute or concentrated organic acid or a dilute inorganic acid.

Another method of obtaining the compounds of this invention involves the reaction of the primary amino group of an aminophenol which has at least one unsubstituted position ortho or para to the phenolic hydroxyl, with a reactive halogen atom selected from the class consisting of chlorine and bromine and which is attached to the carbon atom in the 4 position of a quinoline compound of the formula,

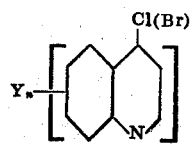

thereby forming hydrogen halide and a compound of the general formula,

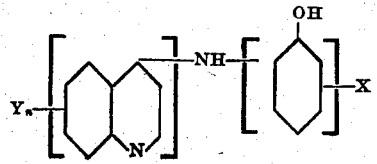

The latter compound is then condensed with formaldehyde (e. g. as solid polymer or gas in solution in aqueous or organic solvents) and a heterocyclic amine having at least one replaceable hydrogen as defined previously by —N<(R), or with the equivalent products or mixtures of products resulting from first condensing said amine and formaldehyde, thereby introducing the group —CH$_2$N<(R) into the aryl nucleus ortho or para to the phenolic hydroxyl to form a compound of the formula,

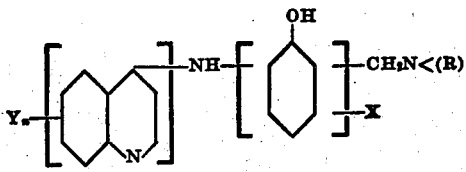

wherein Y, —N<(R), X and $n$ have the same significance as previously stated. Both reactions which lead to the formation of these new compounds of the above type may be carried out in neutral, acidic or basic media by employment of a suitable solvent.

The following specific examples serve to illustrate our invention but do not, however, limit it thereto.

*Example 1.—4-(3'-N-morpholinylmethyl-4'-hydroxyanilino)-7-chloroquinoline dihydrochloride*

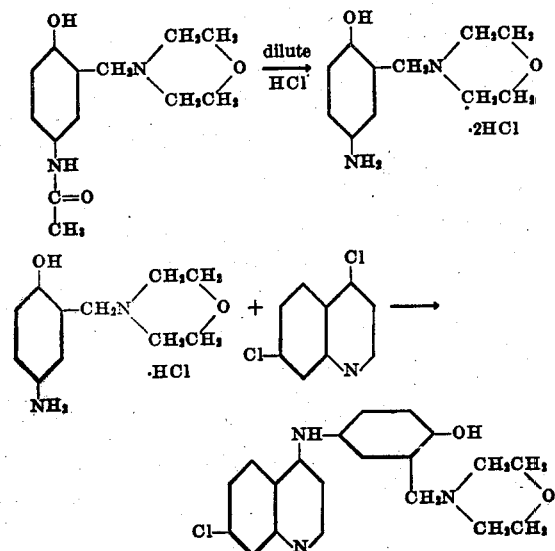

7.5 g. of 2-N-morpholinylmethyl-4-acetylaminophenol and 15 cc. of 20% hydrochloric acid are refluxed for one hour, the solution cooled and the pH adjusted to about four by the addition of 5 N sodium hydroxide solution. 5.94 g. of 4,7-dichloroquinoline, 25 cc. of dioxane and 15 cc. of water are added and the resulting mixture refluxed for two hours. The solution is cooled, made alkaline with ammonium hydroxide and extracted with chloroform. The combined chloroform extract is washed with water, dried over magnesium sulfate, filtered and the filtrate evaporated to 150 cc. Addition of alcoholic hydrogen chloride to the chloroform solution gives a gummy product which crystallizes on standing; M. P. 292° C. dec. Recrystallization from methanol-ethyl acetate mixture does not change the melting point.

*Example 2.—4-(3'-N-piperidylmethyl-4'-hydroxyanilino)-7-chloroquinoline dihydrochloride*

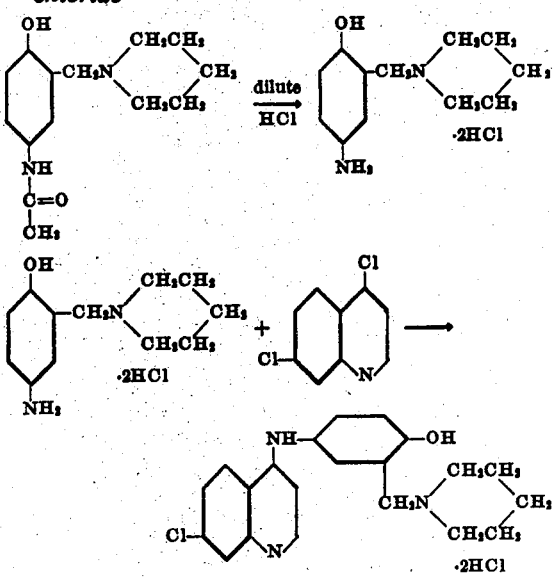

7.08 g. of 2-N-piperidylmethyl-4-acetylaminophenol and 15 cc. of 20% hydrochloric acid are refluxed for one hour, the solution cooled and the pH adjusted to about four by the addition of 5 N sodium hydroxide solution. A mixture consisting of 5.94 g. of 4,7-dichloroquinoline, 15 cc. of dioxane and 15 cc. of water is added and the mixture heated under reflux for two and one-half hours. The solution is cooled, made alkaline with ammonium hydroxide and the product which separates is removed by filtration and washed with water; M. P. 213–16° C.

The crude product is converted to the dihydrochloride without further purification by solution in absolute ethanol and adding an excess of hydrogen chloride in absolute ethanol. On the addition of ethyl acetate a crystalline hydrochloride is obtained which may be recrystallized from absolute ethanol-ethyl acetate mixture; M. P. 301–2° C. dec.

*Example 3.—4'-(3'-N-α-methylpiperidylmethyl-4'-hydroxyanilino)-7-chloroquinoline dihydrochloride*

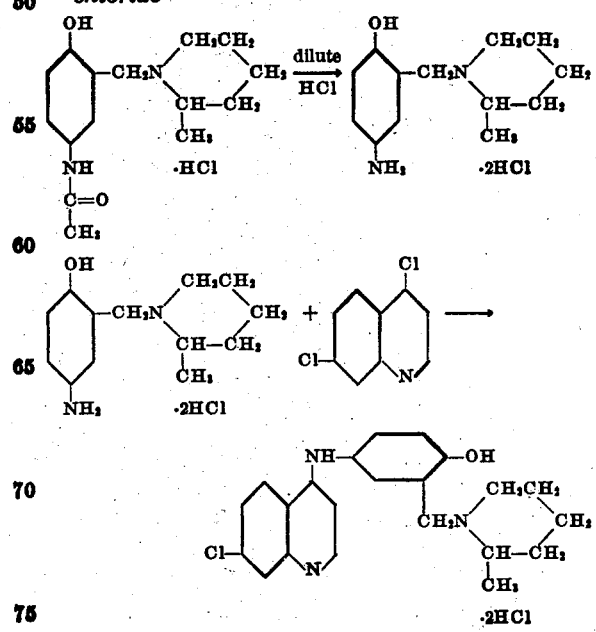

A mixture consisting of 10 g. of 2-N-α-methyl-piperidylmethyl-4-acetylaminophenol hydrochloride and 25 cc. of 20% hydrochloric acid is refluxed for one hour, the solution cooled and the pH adjusted to about 4 by the addition of 5N sodium hydroxide. 6.6 g. of 4,7-dichloroquinoline suspended in a mixture of 50 cc. of dioxane and 25 cc. of water is added and the resulting mixture refluxed for two hours. The solution is cooled, made alkaline with ammonium hydroxide and the solid product which separates collected and washed with water. After drying, the crude product is dissolved by heating with a solution of hydrogen chloride in absolute ethanol. The resulting solution is diluted with acetone and cooled. The green-yellow dihydrochloride which separates is collected and recrystallized from methanol-acetone mixture; M. P. 286–8° C.

*Example 4.—4-(3'-N-thiomorpholinylmethyl-4'-hydroxyanilino) - 7 - chloroquinoline dihydrochloride*

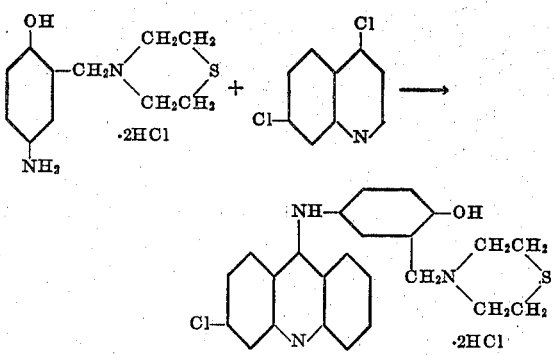

7.5 g. of 2-N-thiomorpholinomethyl-4-aminophenol dihydrochloride, 5.0 g. of 4,7-dichloroquinoline, 30 cc. of dioxane and 30 cc. of water are refluxed for two hours. The solution is cooled, made alkaline with ammonium hydroxide and the solid product which separates removed by filtration and washed with water. After drying, the crude product is taken up in absolute ethanol and an excess of hydrogen chloride in absolute ethanol added. The mixture is warmed on the steam bath, enough acetone added to effect incipient crystallization and the mixture cooled. The dihydrochloride is further purified by recrystallization from methanol-acetone mixture.

*Example 5.—4-[3'-N-piperazinomethyl - 4' - hydroxyanilino] - 7 - chloroquinoline trihydrochloride*

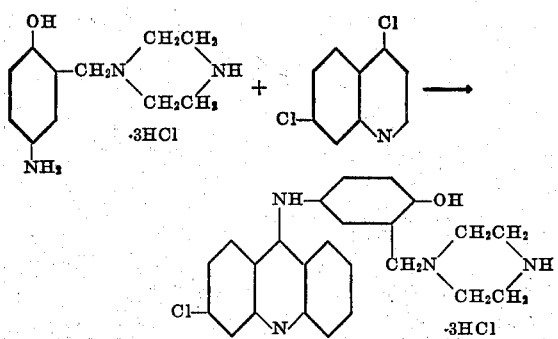

A mixture consisting of 7.5 g. of 2-N-piperazinomethyl-4-aminophenol trihydrochloride, 4.5 g. of 4,7-dichloroquinoline, 30 cc. of dioxane and 30 cc. of water is refluxed for two hours. The solution is cooled, made alkaline with ammonium hydroxide and the gummy product which crystallizes on rubbing removed by filtration and washed with water. The dried crude product is converted to the trihydrochloride by dissolving in absolute ethanol and adding an excess of dry hydrogen chloride in absolute ethanol. The product is precipitated by the addition of anhydrous ether, the solvent decanted and the trihydrochloride recrystallized from methanol-acetone mixture.

*Example 6.—4-[3'-N-(3''-amino)piperidylmethyl-4'-hydroxyanilino]-7-chloroquinoline trihydrochloride*

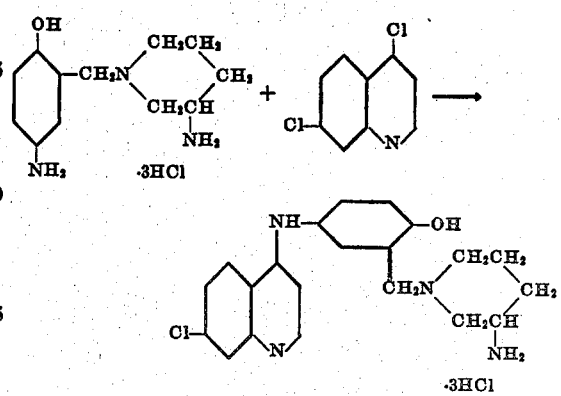

A mixture consisting of 7.5 g. of 2-N-(3'-amino)piperidylmethyl-4-aminophenol trihydrochloride, 4.2 g. of 4,7-dichloroquinoline, 30 cc. of dioxane and 30 cc. of water is refluxed for two hours. The reaction mixture is cooled, made alkaline with ammonium hydroxide and the crude product extracted with chloroform. The chloroform extract is washed with water, the chloroform layer separated and dried over anhydrous magnesium sulfate. The drying agent is removed by filtration and upon the addition of an excess of hydrogen chloride in absolute ethanol to the filtrate the gummy product separates which crystallizes on standing. The crude trihydrochloride is recrystallized from methanol-acetone mixture.

*Example 7.—4-(3'-N-parathiazinylmethyl-4'-hydroxyanilino) - 7 - chloroquinoline dihydrochloride*

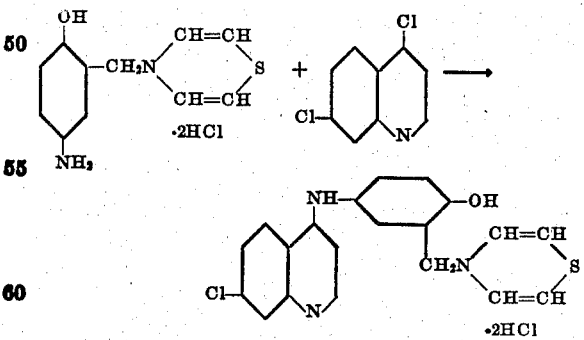

A mixture consisting of 10 g. of 2-N-parathiazinylmethyl-4-aminophenol dihydrochloride, 6.75 g. of 4,7-dichloroquinoline, 30 cc. of dioxane and 30 cc. of water is refluxed for two hours. The solution is cooled, made alkaline with ammonium hydroxide and the crude product extracted with chloroform. The combined chloroform extract is washed with water, the chloroform layer separated and dried over anhydrous magnesium sulfate. The drying agent is removed by filtration and the filtrate treated with an excess of dry hydrogen chloride dissolved in absolute ethanol. The gummy hydrochloride which separates Example 8.—4 - (3' - N-paroxazinylmethyl-4-hydroxyanilino) - 7 - chloroquinoline dihydrochloride

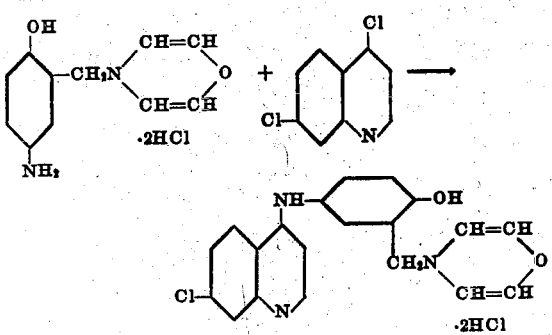

A mixture consisting of 7.5 g. of 2-N-paroxazinylmethyl-4-aminophenol dihydrochloride, 5.35 g. of 4,7-dichloroquinoline, 30 cc. of dioxane and 30 cc. of water is refluxed for two hours. The solution is cooled, made alkaline with ammonium hydroxide and the gummy product extracted with chloroform. The combined chloroform extract is washed with water, separated and dried over anhydrous magnesium sulfate. The drying agent is removed by filtration and an excess of hydrogen chloride in absolute ethanol added to the filtrate. The chloroform is decanted from the gummy dihydrochloride and the residue stirred with anhydrous ether until crystallization takes place. After decantation of the ether the crude dihydrochloride is recrystallized from methanol-acetone mixture.

Example 9.—3-methyl-(3'-N-piperidylmethyl-4'-hydroxyanilino) - 7 - chloroquinoline dihydrochloride

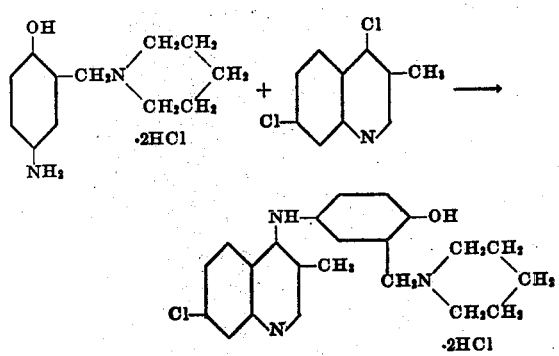

A mixture consisting of 5.58 g. of 2-N-piperidylmethyl-4-aminophenol dihydrochloride, 4.24 g. of 3-methyl-4,7-dichloroquinoline, 25 cc. of dioxane and 25 cc. of water is refluxed for two hours. The solution is filtered, made alkaline with ammonium hydroxide and extracted with chloroform. The combined chloroform extract is washed with water, dried over anhydrous potassium carbonate and the drying agent removed by filtration. Addition of hydrogen chloride in absolute ethanol to the filtrate gives a gummy precipitate. The pure orange-yellow dihydrochloride is obtained by recrystallization of the gummy material from methanol-acetone mixture; M. P. 272° C. dec.

Example 10.—3 - methyl - (3' - N - morpholinylmethyl - 4'-hydroxyanilino)-7-chloroquinoline dihydrochloride

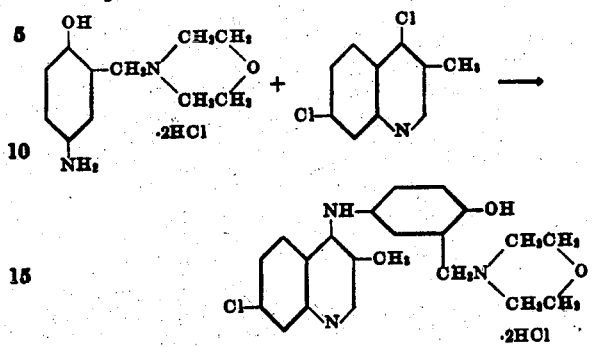

A mixture consisting of 5.62 g. of 2-N-morpholinylmethyl-4-aminophenol dihydrochloride, 4.24 g. of 3-methyl-4,7-dichloroquinoline, 25 cc. of dioxane and 25 cc. of water is refluxed for two hours. The solution is cooled, made alkaline with ammonium hydroxide and extracted with chloroform. The combined chloroform extract is washed with water, dried over potassium carbonate and the drying agent removed by filtration. The filtrate is treated with an excess of hydrogen chloride in absolute ethanol and the chloroform solution decanted from the gummy precipitate. The crude product is recrystallized from methanol-ethyl acetate mixture. Further purification may be affected by boiling with isopropanol in which the product is insoluble; M. P. 242° C. dec.

Example 11. — 4-(3'-N-morpholinylmethyl-4'-hydroxyanilino)-6-methoxyquinoline dihydrochloride

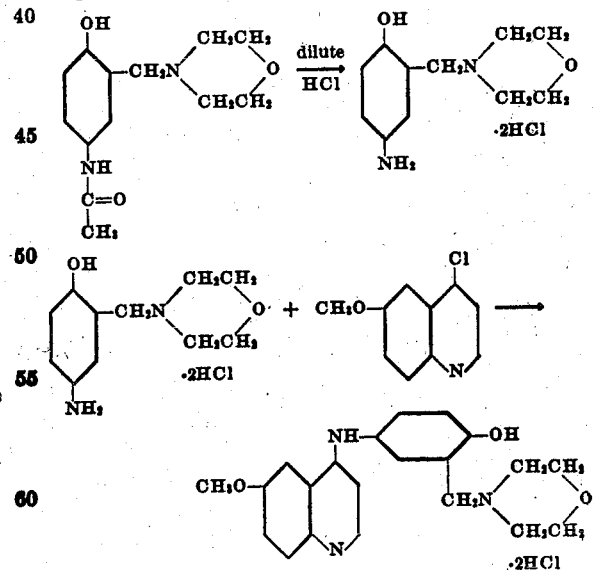

7.5 of 2-N-morpholinylmethyl-4-acetylaminophenol and 15 cc. of 20% hydrochloric acid is refluxed for one hour, cooled and the pH of the solution adjusted to about 4 by the addition of 5N sodium hydroxide solution. 5.82 g. of 4-chloro-6-methoxyquinoline, 25 cc. of dioxane and 15 cc. of water are added and the mixture refluxed for two hours. The solution is cooled, made alkaline with ammonium hydroxide and extracted with chloroform. The combined chloroform extract is washed with water, dried over magnesium sulfate and filtered to remove the drying agent.

Alcoholic hydrogen chloride is added to the filtrate and the chloroform solution decanted from the precipitated solid. The crude product is taken up in methanol and acetone is added until the solution is just turbid. On cooling and standing, the pale-yellow product crystallizes. The dihydrochloride is collected, washed with acetone and recrystallized from methanol-ethyl acetate mixture; M. P. 265° C. dec.

*Example 12. — 4-(3'-N-piperidylmethyl-4'-hydroxyanilino) - 6 - methoxyquinoline dihydrochloride*

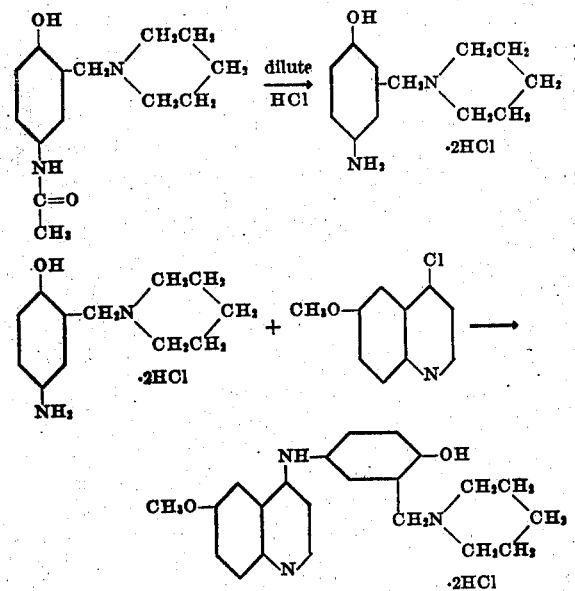

A mixture consisting of 6.4 g. of 2-N-piperidylmethyl-4-acetylaminophenol and 15 cc. of 20% hydrochloric acid is refluxed for one hour, cooled and the pH of the solution adjusted to about 4 by the addition of 5N sodium hydroxide. 5 g. of 4-chloro-6-methoxyquinoline in 15 cc. of dioxane and 15 cc. of water is added and the resulting mixture refluxed for two and one-half hours, cooled and made alkaline with ammonium hydroxide. The gummy, precipitated product is extracted with chloroform, the chloroform extract washed with water and dried over anhydrous magnesium sulfate. The drying agent is removed by filtration, the filtrate treated with alcoholic hydrogen chloride and the solution diluted with ether. The precipitated product is collected, washed with acetone and recrystallized from absolute ethanol-ethyl acetate mixture; M. P. 270° C. dec.

*Example 13. — 4-(3'-N-morpholinylmethyl-4'-hydroxyanilino) - 6-methylquinoline dihydrochloride*

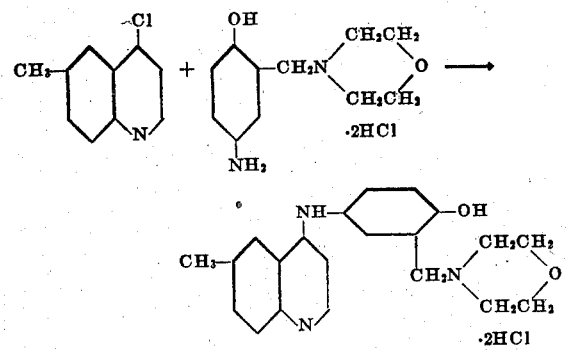

A mixture consisting of 5 g. of 4-chloro-6-methylquinoline and 7.92 g. of 2-N-morpholinylmethyl-4-aminophenol dihydrochloride in 25 cc. of water is heated on a steam bath for two and one-half hours. The solution is cooled, made alkaline with ammonium hydroxide and extracted with chloroform. The combined chloroform extract is dried over anhydrous magnesium sulfate, filtered and most of the chloroform distilled. On cooling of the residue, the crystalline 4-(3'-N-morpholinylmethyl-4'-hydroxyanilino)-6-methylquinoline separates. The base is removed by filtration and recrystallized from methanol; M. P. 236–7° C.

The base is converted to the hydrochloride by solution in absolute ethanol and addition of an excess of dry, gaseous hydrogen chloride. The solution is warmed, acetone added and the solution is cooled. The crystalline dihydrochloride is collected and recrystallized from methanol-acetone mixture.

*Example 14. — 4-(3'-N-piperidylmethyl-4-hydroxyanilino)-6-methylquinoline dihydrochloride*

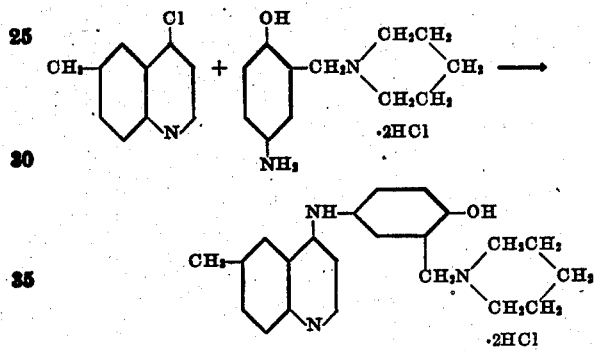

A mixture consisting of 5 g. of 4-chloro-6-methylquinoline and 2 - N - piperidylmethyl-4-aminophenol dihydrochloride in 25 cc. of water is heated on a steam bath for two and one-half hours. The solution is cooled, made alkaline with ammonium hydroxide and extracted with chloroform. The combined chloroform extracts are dried over anhydrous magnesium sulfate, filtered and the filtrate treated with an excess of dry, gaseous hydrogen chloride. The precipitated, gummy dihydrochloride is crystallized by rubbing, collected and recrystallized from methanol-acetone mixture; M. P. 235–7° C. dec.

*Example 15.—3 - carbethoxy - 4-(3'-N-piperidylmethyl-4-hydroxyanilino)-6-methoxyquinoline*

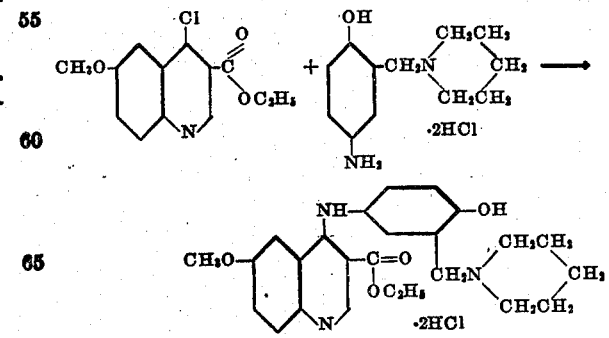

A mixture consisting of 6.5 g. of 3-N-piperidylmethyl-4-aminophenol dihydrochloride and 5.5 g. of 3-carbethoxy-4-chloro-6-methoxyquinoline, 25 cc. of dioxane and 25 cc. of water is refluxed for two hours. The solution is cooled, made alkaline with ammonium hydroxide and extracted with several portions of chloroform. The combined chloroform extract is washed with water, dried over anhydrous magnesium sulfate and the drying agent removed by filtration. Excess hydrogen chloride in absolute ethanol is added to the filtrate which causes the gummy dihydrochloride to separate. The solvent is decanted and the crude product recrystallized from methanol-acetone mixture.

Example 16.—4 - (3'-N - piperidylmethyl - 4'-hydroxyanilino)-6-nitroquinoline dihydrochloride

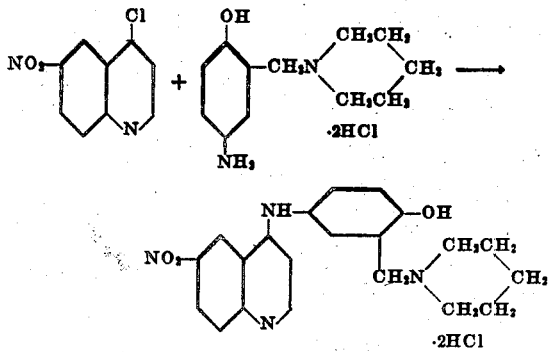

A mixture consisting of 10 g. of 3-N-piperidylmethyl-4-aminophenol dihydrochloride and 7.5 g. of 4-chloro-6-nitroquinoline in 40 cc. of dioxane and 40 cc. of water is refluxed for two hours. The solution is cooled, made alkaline with ammonium hydroxide and extracted with several portions of chloroform. The combined chloroform extract is washed with water, dried over anhydrous magnesium sulfate and filtered. The filtrate is treated with an excess of hydrogen chloride in absolute ethanol and the gummy dihydrochloride which separates collected and washed with acetone. The crude 4-(3'-N-piperidylmethyl-4'-hydroxyanilino) - 6 - nitroquinoline dihydrochloride is recrystallized from methanol-acetone mixture.

Example 17.—4 - (3'-N - piperidylmethyl - 4'-hydroxyanilino)-6-aminoquinoline trihydrochloride

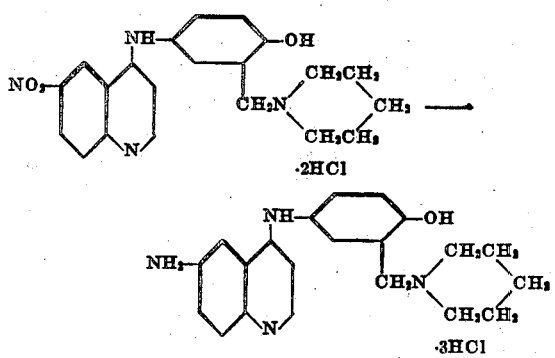

15 g. of 4-(3'-N-piperidylmethyl-4'-hydroxyanilino)-6-nitroquinoline dihydrochloride is dissolved in 300 cc. of methanol and reduced catalytically by shaking with gaseous hydrogen in the presence of platinum oxide catalyst. After the theoretical amount of hydrogen has been absorbed, the catalyst is removed by filtration and the filtrate treated with an excess of dry hydrogen chloride in methanol. The solution is concentrated by heating on a steam bath and acetone is added to the residue. After cooling the crystalline trihydrochloride which separates is collected and recrystallized from methanol-acetone mixture.

Example 18.—4 - (3'-N - piperidylmethyl - 4'-hydroxyanilino) - 6 - acetylaminoquinoline dihydrochloride

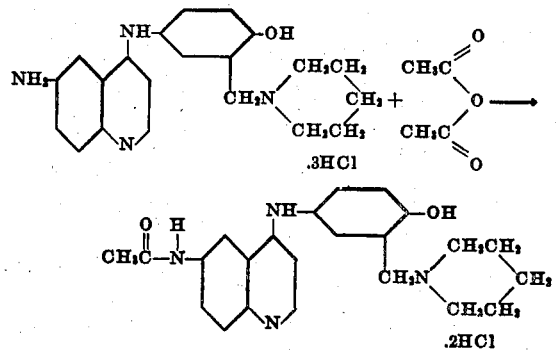

10 g. of 4-(3'-N-piperidylmethyl-4'-hydroxyanilino)-6-aminoquinoline trihydrochloride is dissolved in 50 cc. of water. The solution is heated to 45–50° C. on a steam bath and a solution of 5.5 g. of anhydrous sodium acetate in 7.5 cc. of water added. 3.0 g. of acetic anhydride is added immediately with rapid stirring and the solution allowed to cool to room temperature. The solution is made alkaline with ammonium hydroxide, extracted with several portions of chloroform and the combined chloroform extracts washed with water. The chloroform solution is dried over anhydrous magnesium sulfate, filtered and the filtrate treated with an excess of dry, gaseous hydrogen chloride. The dihydrochloride which separates is collected and recrystallized from methanol-acetone mixture.

Some additional examples which also serve to illustrate our invention and which may be prepared by the same methods described herein include the following:

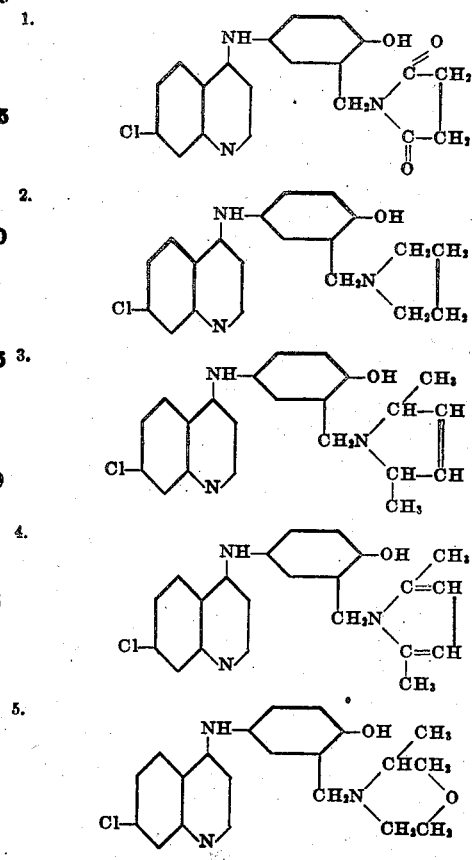

6. 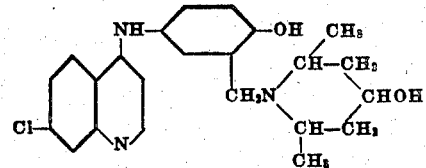

7. 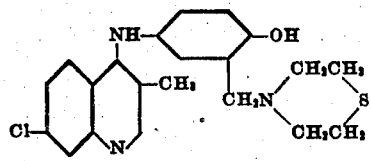

8. 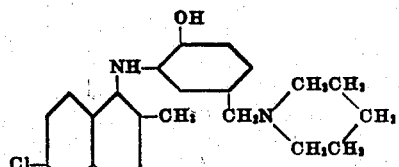

9. 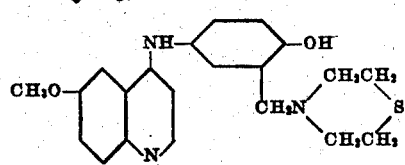

10. 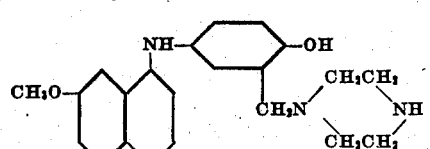

11. 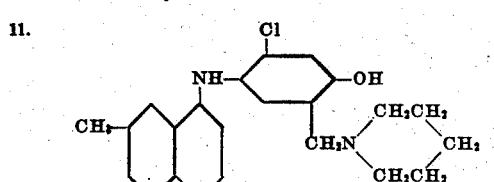

12. 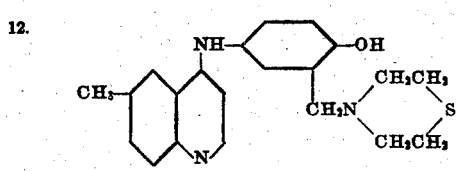

13. 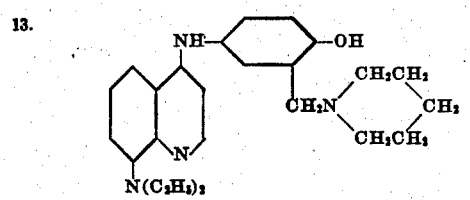

14. 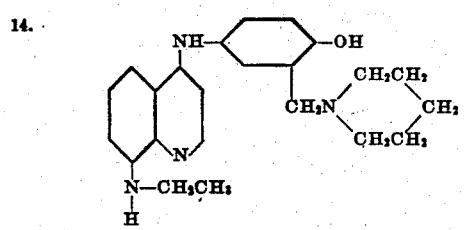

15. 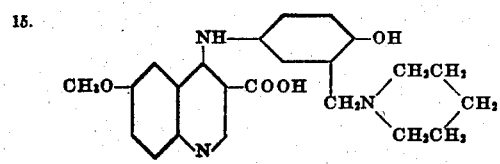

16. 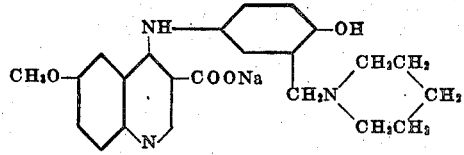

17. 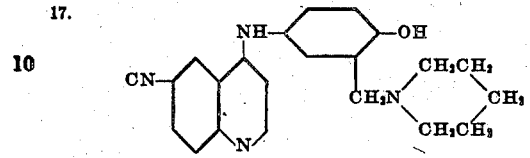

18. 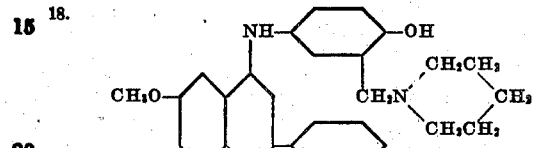

An alternate method of preparing 4-(3'-N-piperidylmethyl-4'-hydroxyanilino)-7-chloroquinoline dihydrochloride (Example 2) is as follows:

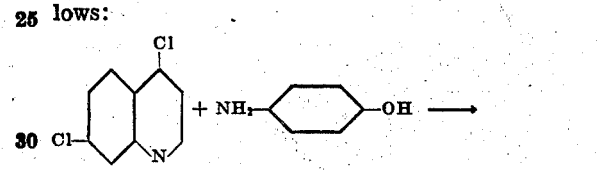

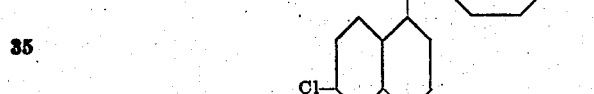

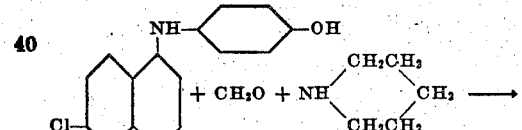

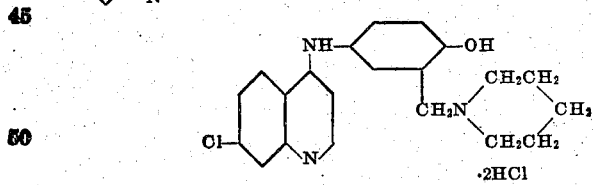

·2HCl 10 g. of p-aminophenol is dissolved in 40 cc. of 2 N hydrochloric acid and 40 cc. of dioxane. The pH of the solution is adjusted to about 4 by the addition of 10 N sodium hydroxide solution and 18.2 g. of 4,7-dichloroquinoline added. The resulting mixture is refluxed for two hours, cooled, diluted to 600 cc. with water and made alkaline with ammonium hydroxide. The precipitated product is removed by filtration, washed well with water and allowed to dry in the air.

A mixture consisting of 10 g. of 4-(4'-hydroxyanilino)-7-chloroquinoline dissolved in absolute ethanol is treated with a solution of 3.1 g. of piperidine and 1.2 g. of formaldehyde in 25 cc. of absolute ethanol. The reaction mixture is heated under reflux for four hours, evaporated to one-half volume and the warm solution treated with an excess of hydrogen chloride in absolute ethanol. Acetone is added until the solution becomes turbid and then the solution is cooled. The crude hydrochloride is recrystallized from absolute ethanol-ethyl acetate mixture; M. P. 301-2° C. dec.

Likewise an alternate method of preparing 4-(3'-N-piperidylmethyl-4-hydroxyanilino)-6-methoxyquinoline dihydrochloride (Example 12) is as follows:

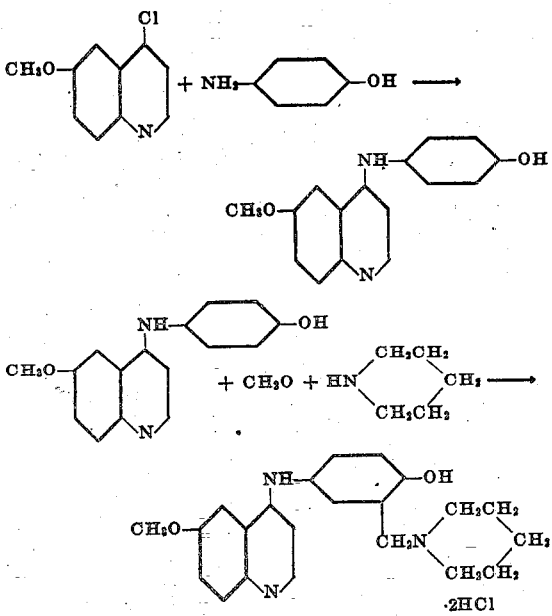

10 g. of p-aminophenol is dissolved in 40 cc. of 2 N hydrochloric acid and 40 cc. of dioxane. The pH of the solution is adjusted to about 4 by the addition of 10 N sodium hydroxide solution and 17.7 g. of 4-chloro-6-methoxyquinoline added. The resulting mixture is refluxed for two hours, cooled, diluted to 600 cc. with water and made alkaline with ammonium hydroxide. The precipitated product is removed by filtration, washed well with water and allowed to dry in the air.

A mixture consisting of 10 g. of 4-(4'-hydroxyanilino)-6-methoxyquinoline dissolved in absolute ethanol is treated with a solution of 3.2 g. of piperidine and 1.2 g. of formaldehyde in 25 cc. of absolute ethanol. The reaction mixture is heated under reflux for four hours, evaporated to one-half volume and the warm solution treated with an excess of hydrogen chloride in absolute ethanol. Acetone is added until the solution becomes turbid and then the solution is cooled. The crude hydrochloride is recrystallized from absolute ethanol-ethyl acetate mixture; M. P. 270° C. dec.

The intermediate heterocyclic aminomethylaminophenols herein referred to as compounds A are usually prepared from acylaminophenols by means of the Mannich reaction (copending application Serial No. 556,496). This particular application of the reaction consists in the condensation of a heterocyclic amine with formaldehyde and acylaminophenols having at least one unsubstituted position ortho or para to the phenolic hydroxyl. The resulting N-substituted heteraminomethylacylaminophenols are hydrolyzed with mineral acid to the corresponding heteraminomethylaminophenols. The same intermediates can be prepared by the catalytic or nascent hydrogen reduction of heteraminomethylnitrophenols obtained by the Mannich reaction or by the reaction of chloro- or bromo-methylnitrophenols with a heterocyclic amine.

The 4-chloroquinolines herein referred to as compounds B can be prepared by the method of Magidson and Rubstov [J. Gen. Chem. (U. S. S. R.), 7, 1896 (1937); C. A., 32, 564 (1938)] or from the corresponding hydroxy quinolines which can be prepared by the method of Gould and Jacobs [J. Am. Chem. Soc., 61, 2890 (1939)] or by that of Theos J. Thompson [M. S. Thesis, University of Nebraska, July 24, 1942].

For the preparation of quinoline intermediates with substituents in the 2-position such as the 2-phenyl derivatives, the method of Knorr [Ann., 245, 378 (1888)] involving the reaction of aniline or substituted anilines with benzoyl acetic ester is used. The 3-substituted-4-hydroxyquinolines are prepared by the method given in United States Patent No. 2,233,970.

Attention is directed to our copending application Serial No. 626,906, filed November 5, 1945, as a continuation-in-part of the instant case wherein we have described and claimed another process for obtaining the instant quinoline compounds as well as related quinoline compounds. Attention is also directed to certain of our other copending applications wherein somewhat related quinoline compounds are described and claimed as follows: Serial No. 556,496, filed September 29, 1944; Serial Nos. 626,907 and 626,908, filed November 5, 1945, and Serial No. 722,474, filed January 16, 1947.

What we claim as our invention is:

1. A compound of the class consisting of a free base and its acid addition salts, said free base having the formula

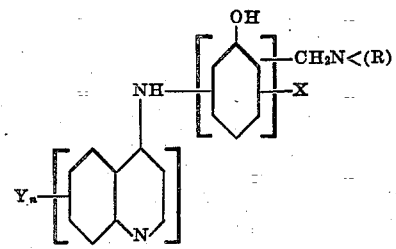

where Y is a member of the class consisting of hydrogen, —CN, —COOH, —COO(lower alkyl), halogen, lower alkyl, lower alkoxy and phenyl, $n$ is an integer of the group consisting of 1 and 2, X is a member of the class consisting of hydrogen and halogen, —CH$_2$N<(R) is a group attached to a carbon atom of the aryl nucleus in one of the positions ortho and para to the hydroxy group and N in said group —CH$_2$N<(R) taken with R forms a ring system of the class consisting of saturated and unsaturated five-membered heterocyclic ring systems, saturated and unsaturated six-membered heterocyclic ring systems, members wherein the carbon chain of said six-membered ring system in interrupted by one of the members of the class consisting of —O—, —S—, —N< and —NH— and further members wherein said group R is substituted on a carbon atom thereof by at least one member of the class consisting of =O, —OH, —NH$_2$ and lower alkyl.

2. An acid addition salt of a compound having the following formula:

3. An acid addition salt of a compound having the following formula

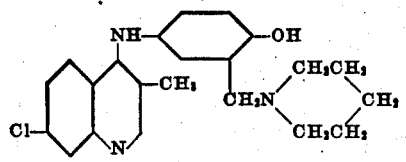

4. An acid addition salt of a compound having the following formula

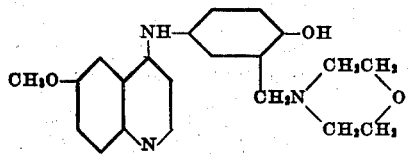

5. A compound having the formula

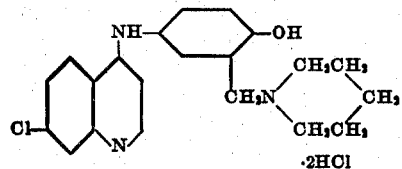

6. A compound having the formula

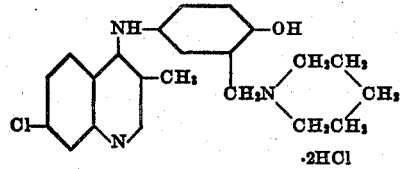

7. A compound having the formula

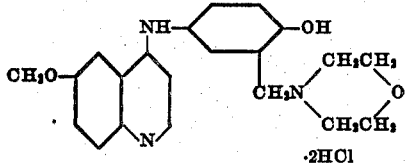

8. The process for preparing a compound having the formula

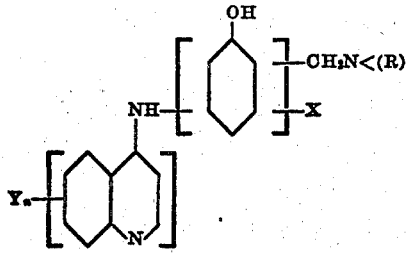

which comprises condensing a compound having the formula

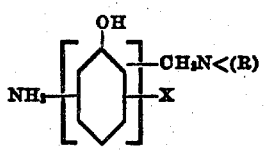

with a compound having the formula

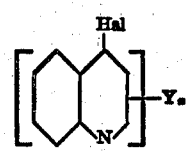

where Hal is a member of the class consisting of Cl and Br, Y is a member of the class consisting of hydrogen, —CN, —COOH, —COO(lower alkyl), halogen, lower alkyl, lower alkoxy and phenyl, $n$ is an integer of the group consisting of 1 and 2, X is a member of the class consisting of hydrogen and halogen, and —CH₂N<(R) is a group attached to a carbon atom of the aryl nucleus in one of the positions ortho and para to the hydroxy group and N in said group —CH₂N<(R) taken with R forms a ring system of the class consisting of saturated and unsaturated five-membered heterocyclic ring systems, saturated and unsaturated six-membered heterocyclic ring systems, members wherein the carbon chain of said six-membered ring system is interrupted by one of the members of the class consisting of —O—, —S—, —N< and —NH— and further members wherein said group R is substituted on a carbon atom thereof by at least one member of the class consisting of =O, —OH, —NH₂ and lower alkyl.

9. The process which comprises condensing a compound having the formula

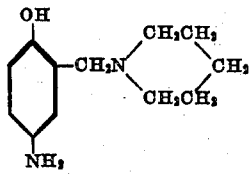

with a halogenated quinoline having the formula

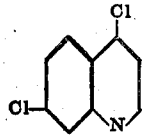

thereby obtaining a compound having the formula

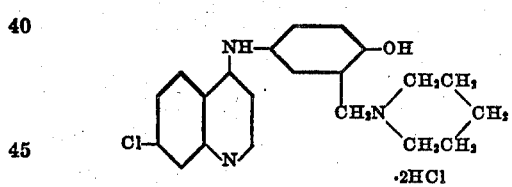

10. The process which comprises condensing a compound having the formula

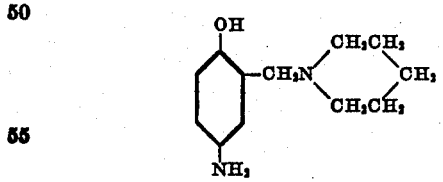

with a halogenated quinoline having the formula

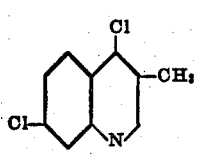

thereby obtaining a compound having the formula

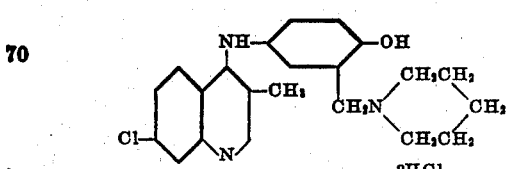

11. The process which comprises condensing a compound having the formula

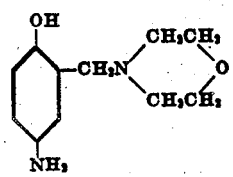

with a halogenated quinoline having the formula

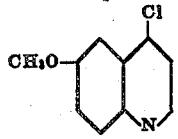

thereby obtaining a compound having the formula

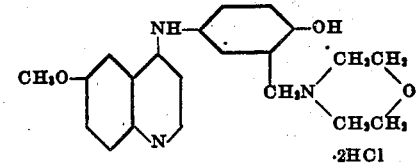

12. A hydrohalide salt of 4-[3'-N-piperidylmethyl-4'-hydroxyanilino]-7-chloroquinoline.

13. A hydrohalide salt of 3-methyl-[3'-N-piperidylmethyl - 4' - hydroxyanilino] - 7 - chloroquinoline.

14. A hydrohalide salt of 4-[3'-N-morpholinylmethyl-4'-hydroxyanilino]-6-methoxyquinoline.

JOSEPH H. BURCKHALTER.
ELDON M. JONES.
ALBERT L. RAWLINS.
FRANK H. TENDICK.
WALTER F. HOLCOMB.

No references cited.